(12) United States Patent
Menefee

(10) Patent No.: US 6,264,340 B1
(45) Date of Patent: Jul. 24, 2001

(54) PORTABLE, UNIVERSAL, NON-DESTRUCTIVE AND STABLE DEVICE FOR VIEWING AN INFANT IN THE REAR SEAT OF A VEHICLE

(76) Inventor: Dennis Menefee, 350 Deer Pointe Cir., Casselberry, FL (US) 32707

( * ) Notice: Subject to any disclaimer, the term of this patent is extended or adjusted under 35 U.S.C. 154(b) by 0 days.

(21) Appl. No.: 09/564,243

(22) Filed: May 4, 2000

(51) Int. Cl.[7] .................................................. G02B 7/182
(52) U.S. Cl. ........................... 359/881; 359/844; 359/872
(58) Field of Search .................................... 359/844, 857, 359/860, 862, 863, 865, 871, 872, 881

(56) References Cited

U.S. PATENT DOCUMENTS

| | | |
|---|---|---|
| 4,549,790 | 10/1985 | Harris, Jr. . |
| 4,702,572 | 10/1987 | Cossey . |
| 4,733,956 | 3/1988 | Erickson . |
| 4,902,118 | 2/1990 | Harris . |
| 4,909,618 | 3/1990 | Gardner . |
| 5,453,882 | 9/1995 | Westman ............................... 359/855 |
| 5,576,898 | 11/1996 | Rubin .................................... 359/841 |
| 5,668,526 | 9/1997 | Collins .................................. 340/326 |
| 6,039,455 | * 3/2000 | Sorenson .............................. 362/142 |
| 6,120,155 | * 9/2000 | Brennan et al. ..................... 359/857 |

* cited by examiner

*Primary Examiner*—Cassandra Spyrou
*Assistant Examiner*—Mark A. Robinson
(74) *Attorney, Agent, or Firm*—Brian S. Steinberger; Law Offices of Brian S. Steinberger

(57) ABSTRACT

A device which enables a driver of a vehicle to monitor an infant in a rear seat by the rear view mirror of the vehicle, where the device is portable, universally applicable to passenger vehicles and non-destructive of the vehicle interior yet secure against vehicular vibration. The device consists of a threaded telescoping mast having a mirror for viewing the infant which mast is positioned between the top of the backseat and the headliner and secured by outward pressures developed by a wing nut positioned on the mast.

12 Claims, 4 Drawing Sheets

PORTABLE, UNIVERSAL, NON-DESTRUCTIVE AND STABLE DEVICE FOR VIEWING AN INFANT IN THE REAR SEAT OF A VEHICLE

This invention relates to a device for viewing an infant in the rear seat of a vehicle and, more particularly, to a portable and universal infant viewing device employing an additional mirror stabilized between the roof and back seat of the vehicle.

BACKGROUND OF THE INVENTION

When traveling in a vehicle such as an automobile, a two seated truck, a van or the like, it is lawfully necessary to place an infant in the back seat of the vehicle providing safety to the infant.

However, problems are encountered when the infant is placed in the rear seat of the vehicle since it is often difficult, if not impossible, to view the infant properly and still enable the driver of the vehicle to maintain proper eye contact with the road.

Further, the law requires that infants be placed in a specially designed infant seat, which is constructed and arranged, so that the infant is facing the rear of the vehicle.

There are numerous United States patents disclosing the use of a back seat mounted infant seat with a forward facing viewing mirror aligned with the front rear-view mirror including:

Cossey, U.S. Pat. No. 4,702,572 which discloses a device for viewing an infant in the rear seat which device clamps with difficulty and prospective instability onto the top of the back seat and includes a telescopically mounted mirror which slopes downward so the driver can readily see the infant in the rear view mirror;

Westman, U.S. Pat. No. 5,453,882 shows another rear seat object viewing device mounted (for adequate stability it must be interior-destructively screwed into the vehicle interior) between the seat and the headliner having an adjustable (rear-view distorting) mast and slanted mirror to reflect an object into the rear mirror so the object can be seen by the driver;

Harris, U.S. Pat. No. 4,902,118 discloses another infant observation mirror strapped (with difficulty to impossibility) with poor security to the top of the rear seat in a position which makes it difficult to see the infant from the rear-view mirror;

Erickson, U.S. Pat. No. 4,733,956 shows yet another non-portable mirror system (not universal) with the mirror insecurely mounted to the rear window by an adhesive;

Rubin, U.S. Pat. No. 5,576,898 also involves a non-portable, rear-viewing system for a vehicle wherein the mirror is mounted in the headliner and folds down for use;

Harris, Jr., U.S. Pat. No. 4,549,790 similarly discloses a non-portable, rear-viewing system for a multiple seat vehicle which uses a circular mirror mounted directly to the interior rear of the vehicle;

Gardner, U.S. Pat. No. 4,909,618 discloses a non-portable rear seat viewing device having a mirror mounted on the shelf posterior to the rear seat with a light source around the perimeter of the mirror to light an infant's face at night while obscuring the driver's view out of the rear window; and, Collins, U.S. Pat. No. 5,668,526 discloses an infant monitoring system using a mirror mounted in a teddy bear or similar item which is mounted on the back seat rest and prospectively can be vibrated loose from it (non-secure) and which system requires changing the rear-view mirror to observe the infant.

Unfortunately, all these disclosures fail to teach individually or collectively suggest a back seat situated infant viewing system observable from a front rear-view mirror having portability, universality of use and vibration secure without destructively altering the interior of the vehicle and visual obstruction exterior of the rear window.

SUMMARY OF THE INVENTION

It is therefore an object of the present invention to provide a portable system for viewing an infant in the rear seat of a vehicle while enabling the driver of the vehicle to maintain proper eye contact with the road.

It is a further object of the present invention to provide a vehicle vibration secure system of the above type in which a driver utilizes his standard vehicle rear view mirror to view the infant in the back seat.

It is a still further object of the present invention to use an adjustable reflector, such as a second mirror, disposed in the back seat to reflect the image of the infant to the rear-view mirror of the vehicle for viewing by the driver of the vehicle.

The portable, universal system of the present invention is designed for viewing an infant in the rear seat of the vehicle and utilizes an infant imaging mirror mounted on an adjustable means between the back seat and headliner of the vehicle to provide vibration security, said mirror adjustably alignable to the rear-view mirror for viewing of the infant by the driver of the vehicle.

BRIEF DESCRIPTION OF THE FIGURES

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It is preferred to discuss the meanings of some words used herein including:

portable indicates that the device can be readily taken from one vehicle to and secured in another;

universal indicates that it can be used in any multi-seat vehicle;

non-destructive is the property of installation of the device in the vehicle without damage (penetration) to the interior of the vehicle, particularly the headliner and/or the seat bench (including the backrest); and, stable means that the device has the property of being secure against vehicular vibration.

All parts of the devices of the invention are rounded with a large radius structure so as to reduce the potential for injury in the event of a crash or similar injury to the vehicle using the invention disclosed herein.

Figure 1B:
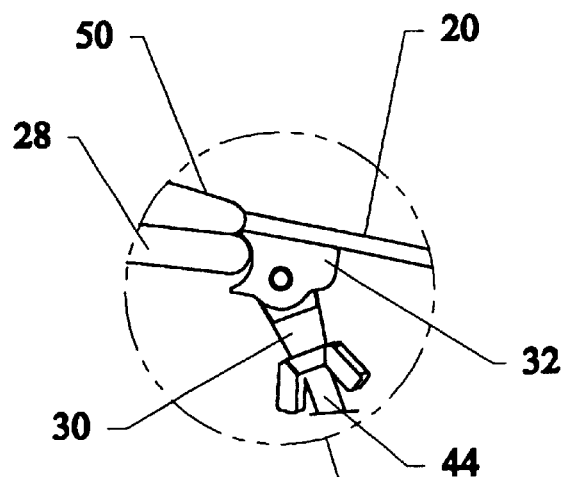
FIG. 1A is a side view, partly cut away, of a passenger car incorporating a mirror-positioned, length-adjustable mast placed between its rear seat and headliner according to the present invention with an exploded view, FIG. 1B, of the securing of the mast against the headliner adjacent to the rear window.
Figure 1A:
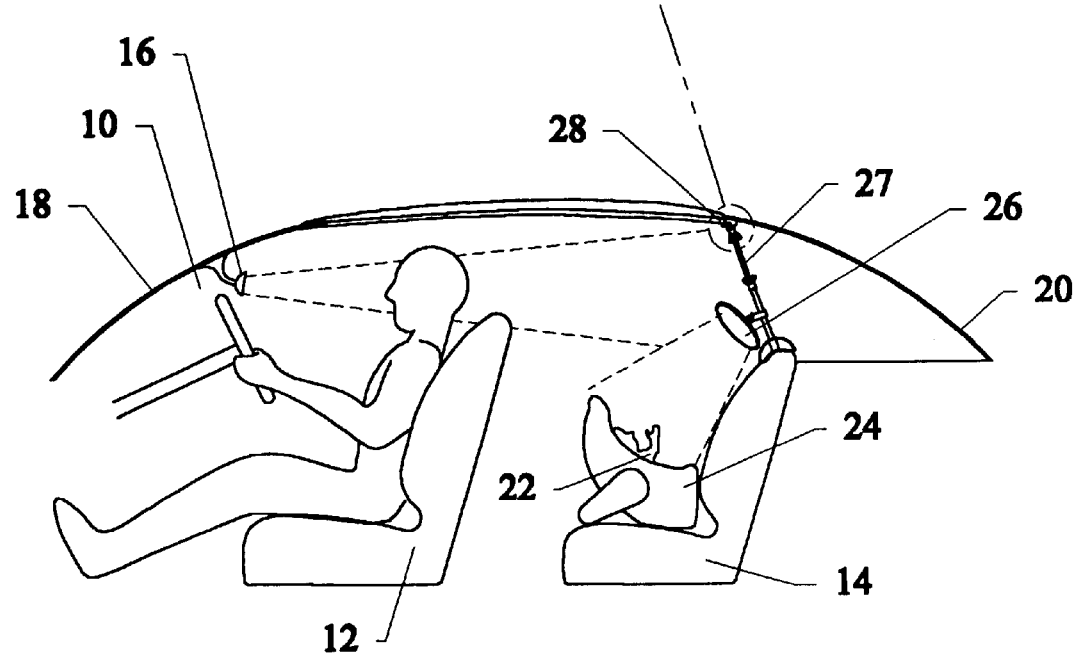

Referring specifically to FIG. 1A of the drawings, the numeral 10 refers in general to a passenger van having a front seat 12 and a rear seat 14. A standard rear view mirror 16 is mounted on the inner surface of the front window 18 and is designed to reflect images from the rear of the vehicle which pass through the rear window 20 during normal driving conditions.

The device of the invention enables the driver to view through the rear view mirror 16, an infant 22 placed in the rear seat 14. For the purpose of this example, it is assumed that an infant 22 is disposed in a baby seat 24 placed on the seat portion of the rear seat 14 in a direction facing the rear of the vehicle 10 as shown.

To this end, a reflecting member, such as a mirror 26, is mounted to the back seat portion of the rear seat 14 and is designed to reflect the image of the infant 22 in the baby seat 24 to the rear view mirror 16 for direct viewing by the driver.

As earlier noted, FIG. 1A is a side view, partly cut away, of a vehicle 10 incorporating a mirror-positioned, length-adjustable mast 27 placed between its rear seat 14 and headliner 28 according to the present invention with an exploded view FIG. 1B of the securing of the mast 27 by means of window pad 32 against the headliner 28 at the notch 50 provided by the contiguous rear window 20.

Figure 2B:
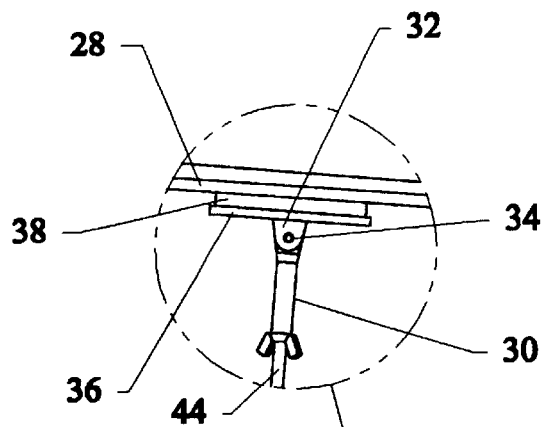
FIG. 2A is a similar view partly cut away, of a van or SUV vehicle incorporating a mirror-positioned, length-adjustable mast placed between its rear seat and the headliner according to the present invention with an exploded view, FIG. 2B, of the securing of the mast directly against the headliner but removed from the rear window according to the present invention.
Figure 2A:
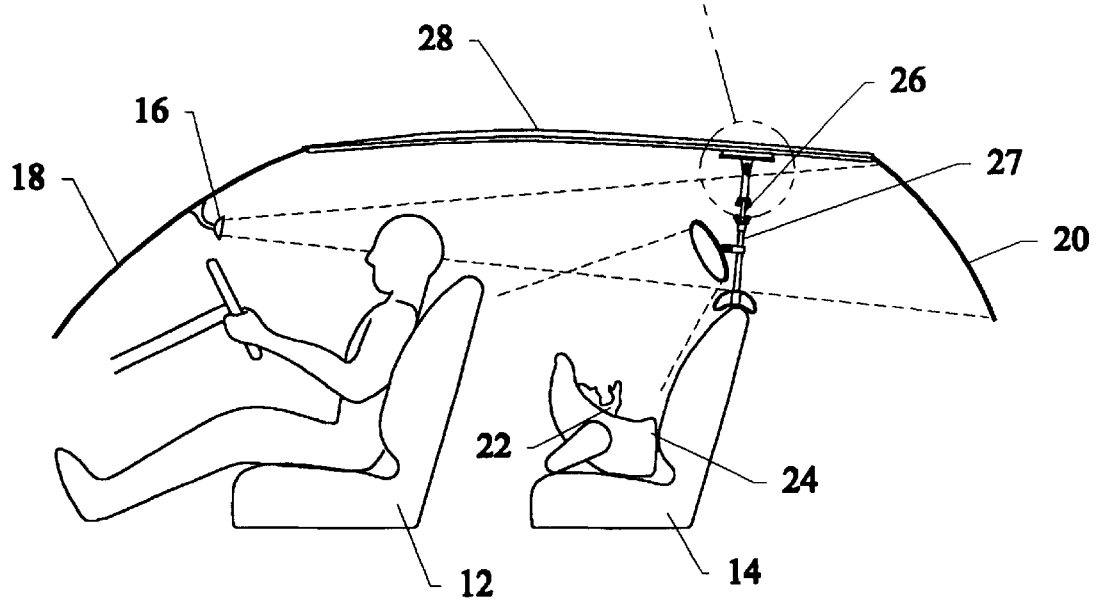

As earlier noted, FIG. 2A illustrates the invention which is particularly useful for vans and SUVs where the length adjustable mast 27 is placed between a rear seat 14 and directly against the headliner 28 and frictionally secured thereto by headliner pad 36. As illustrated in exploded view FIG. 2B, a swivel post 30 is threaded onto rod 44 at its upper end and pinned by a spring pin 34 to swivel 32 connected to headliner pad 36 with its foam backing 38 which presses against the headliner 28 to secure the device.

Figure 3:
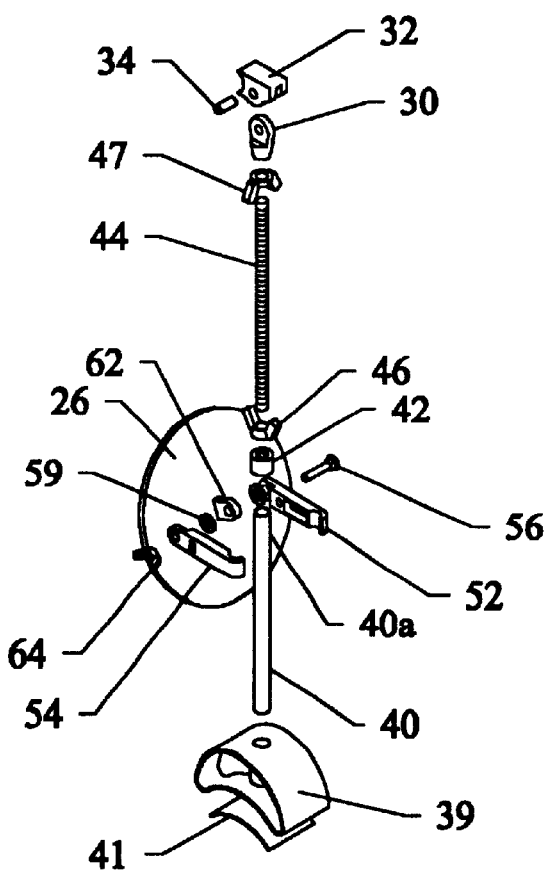
FIG. 3 is a fully exploded view of the device of the invention in the embodiment best suited for securing the device between the seat and the junction of the headliner and rear window as earlier discussed with respect to FIG. 1A; and, FIG. 4 is a side view of an assembled device of the invention as pictured in FIG. 2A and its exploded view of FIG. 2B; and, FIG. 5 shows a light for illumination of the infant.

In the drawing of FIG. 3, the device of the invention particularly useful for passenger cars is illustrated in an exploded view. You will recall that it is secured between the top of the back seat 14 to above discussed junction notch 50 provided by the rear window 20 and the headliner 28. The seat foot 39 and associated foot pad 41 securely supports the support tube 40 with its shoulder cap 42 allowing the threaded rod 44 to telescope within tube 40; a lower wing nut 46 and an upper wing nut 47 are threadably positioned on the threaded rod 44 to facilitate securing the positioned device in a vibration secure manner; a short swivel post 30 is threaded onto upper end of the rod 44 and post 30 is in turn pinned by spring pin 34 to the window pad 32 adapted to cooperate with the notch junction 50 of the headliner 28 and the rear window 20.

As illustrated in exploded view, the mirror 26 is adjustably connected to the support tube 40 with the two cooperating clamp arms 52 and 54. The other ends of the arm are connected together via a carriage bolt 56 passing through the first arm 52 then the right washer 58 then the mirror spring pin 60 then the mirror back appendage 62 then the left washer 59, then the second arm 54 and finally secured with a wing nut 64.

To install the device of FIGS. 1A and 3 in the passenger car, thread the window pad 32 onto the adjustable mast, i.e., rod 44, and thereafter spin the top wing nut 47 is snug against the window pad 32 locking it in place. The opposite end of threaded rod 44 (with the attached mirror 26) is inserted into the support tube 40 of the seat pad 39. Place the seat pad 39 on the top of the back seat 14 backrest and adjust the bottom wing nut 46 to secure the device of the invention between the notch 50 formed by the headliner 28 and rear window 20 and top of the back seat 14 backrest as shown in FIG. 1A. Adjust the mirror to obtain the best view of the baby seat 24 without obstructing the view of the traffic to the rear of the vehicle.

Figure 4:
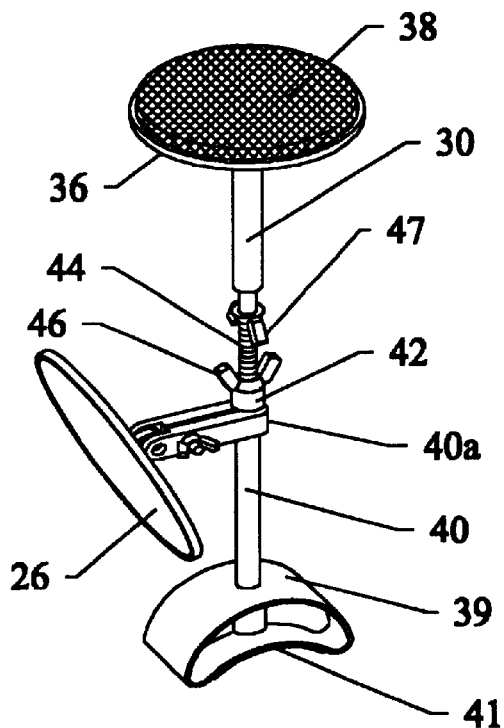

It is in FIG. 4 that a device of the invention particularly applicable to a passenger van and a SUV is set forth in exploded view. Starting again from the bottom of the drawing of FIG. 4: the foot pad 41 rests against the top of the seat and cooperates with the seat foot 39 which in turn secures the support tube 40; the upper end 40a has a shoulder cap 42 into which the threaded rod 44 telescopes; the threaded rod 44 has a cooperating lower wing nut 46 and upper wing nut 47; a swivel post 30 is threaded onto the upper end of the rod 44; and it in turn is pinned by spring pin 34 to the swivel 32 (not shown here but illustrated in FIG. 2B) connected to headliner pad 36 and its foam backing 38.

Installation of the inventive device embodied in FIGS. 2A and 4 is similarly simple. The headliner pad 36 is thread onto one end of the threaded rod 44 and the top wing nut 47 spun snugly up against the headliner pad 36 locking it in place. The opposite end of rod 44 (with its attached mirror) is inserted into the support tube 40 of seat pad 39. Seat pad 39 is thereafter placed on the top of the backseat 14 backrest and the bottom wing nut 46 is adjusted to secure the device of the invention between the surface of the vehicle headliner 28 and top of the backseat 14 backrest as shown in FIG. 2A. For best security, it is useful to position the headliner pad 36 1 to 2 inches closer to the rear of the vehicle than the seat pad 39.

The device mast is preferably formed from a metal such as stainless steel so as to provide a structure of size and ease of positioning which obscures as little as possible of the driver's view of vehicular traffic seen through the rear window and yet can readily view the infant via the rear view mirror.

Figure 5:
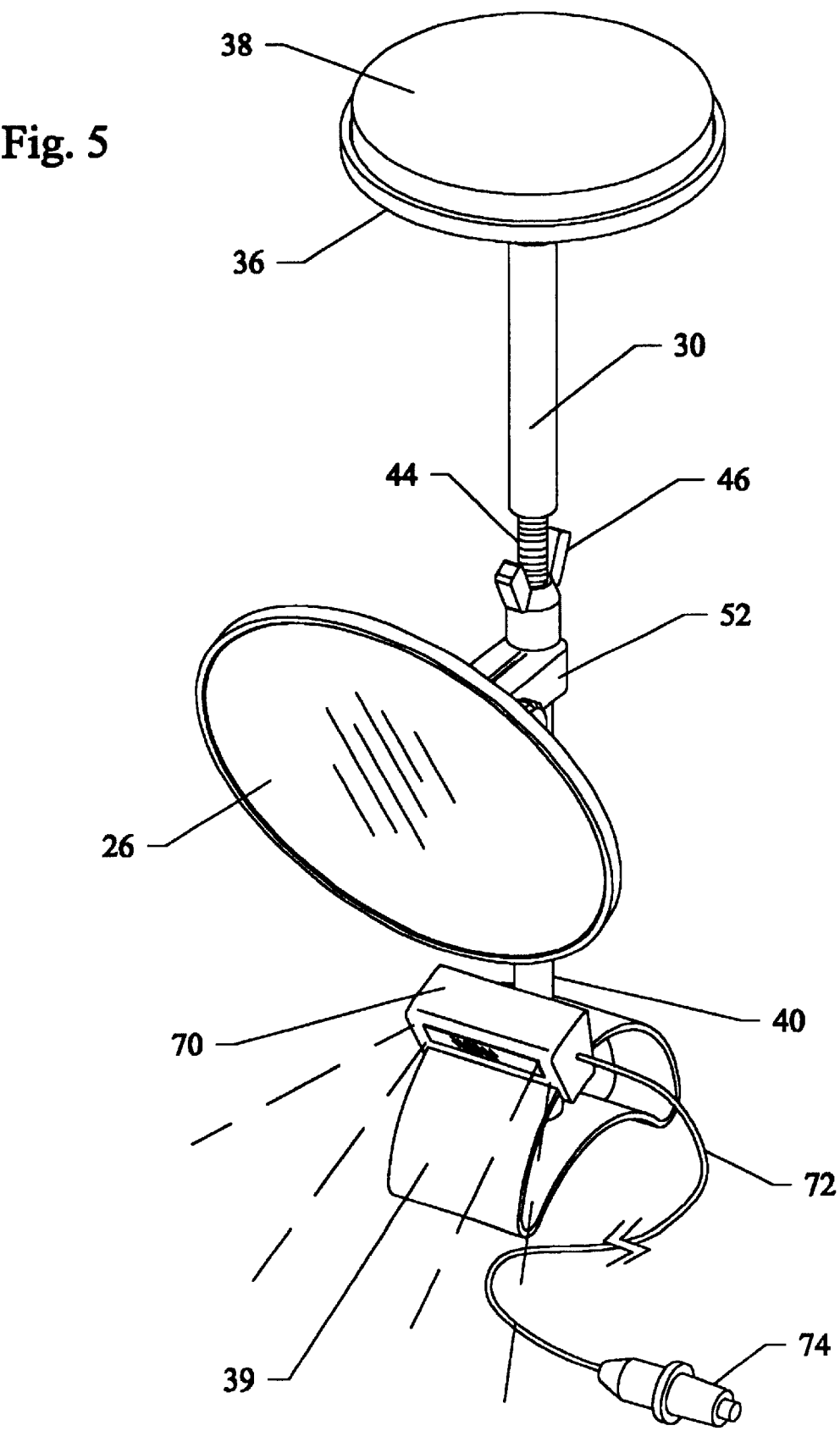

If desired the infant can be readily illuminated with the light as illustrated in FIG. 5 secured to the device of either of FIG. 1B or 2B. For simplification, the numbers of FIG. 5 are common to those of FIGS. 1B and 2B. and represent the same elements. The light 70 is swivelly connected to the tube 40 and secured (if desired) by the seat foot 39 so as to fully illuminate the infant. The light 70 is powered by means of a cord 72 connected to the cigarette lighter plug 74.

It is thus seen that many advantages result from the foregoing teachings. For example, the device of the present invention is fully portable and universal in application since it can be readily moved from vehicle to vehicle. It enables the driver of the vehicle to maintain eye contact with the road while he utilizes his standard vehicle rear view mirror to view the infant in the back seat and is able to view the highway to the rear without distortion or excessive obstruction. Further, the device is secured in the vehicle without destruction of any part of the interior of the vehicle. Finally, all edges of the appendages and supports are rounded and fabricated with large radius structures.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A portable and non-destructive device for viewing an infant in the rear seat of a vehicle by utilizing a mirror mounted on a mast supported on the backseat of said rear seat for reflecting the image of said infant to the vehicle's rear view mirror comprising:

a threaded rod which telescopes into an upper end of a support tube, the threaded rod and the support tube together forming the mast, with the mirror mounted on the mast;

a seat pad secured to a lower end of the mast; and a means for non-destructively securing an upper end of the mast to the headliner of said vehicle.

2. The device of claim 1, wherein said means comprises:

a window pad adapted to be placed at the notch provided by the junction of the rear window and the headliner of said vehicle.

3. The device of claim 1, wherein said means comprises:

a head liner pad adapted to be placed directly against the headliner and at a position not contiguous to the rear window of said vehicle.

4. The device of claim 1, wherein said threaded rod additionally comprises:

at least one wing nut threadably engaged to be moved against said support tube in order to develop pressure along said rod away from said support tube.

5. The device of claim 1, comprising:

a foot pad adapted to rest on the back seat of said vehicle , with the support tube secured to said foot pad, and the mirror secured to said support tube;

a wing nut threadably engaged with said threaded rod; and a headliner contact structure adapted to be screwed onto the upper end of the mast.

6. The device of claim 5, wherein said headliner contact structure is a window pad.

7. The device of claim 5, wherein said headliner contact structure is a headliner pad.

8. A device which enables front seated drivers of a vehicle to monitor a space between a rear seat backing and a front seat backing, comprising:

a height adjustable support having an upper end and a lower end;

a mirror attached to the support;

a seat foot secured to the lower end of the support; and means for non-destructively securing the upper end of the support to a portion of a headliner of said vehicle.

9. The device of claim 8, further comprising:

a seat pad on the seat foot.

10. The device of claim 8, wherein the non-destructive means includes:

a pad.

11. The device of claim 8, wherein the non-destructive means includes:

a portion of foam.

12. A device for viewing space behind a front seat in a vehicle, comprising:

a support having an upper end and a lower end;

a mirror attached to the support;

first means for non-destructively securing the lower end of the support to a back seat; and second means for non-destructively securing the upper end of the support to a portion of a headliner of said vehicle.

* * * * *